United States Patent
Lee et al.

(10) Patent No.: US 12,377,868 B2
(45) Date of Patent: Aug. 5, 2025

(54) REMOTE PARKING CONTROL SYSTEM AND FAIL-SAFE METHOD THEREOF

(71) Applicants: Hyundai Motor Company, Seoul (KR); Kia Corporation, Seoul (KR)

(72) Inventors: Ki Ho Lee, Gyeonggi-do (KR); Gil Won Seo, Gyeonggi-do (KR); Kyeong Mo Yang, Gyeonggi-do (KR); Wan Seok Yang, Gangnam-Gu (KR); Yun Sik Kim, Dongjak-Gu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 427 days.

(21) Appl. No.: 17/702,298

(22) Filed: Mar. 23, 2022

(65) Prior Publication Data

US 2023/0001938 A1  Jan. 5, 2023

(30) Foreign Application Priority Data

Jul. 5, 2021 (KR) ........................ 10-2021-0088004

(51) Int. Cl.
| | |
|---|---|
| B60W 30/06 | (2006.01) |
| B60W 10/08 | (2006.01) |
| B60W 10/10 | (2012.01) |
| B60W 10/20 | (2006.01) |
| B60W 50/029 | (2012.01) |
| B60W 30/09 | (2012.01) |

(52) U.S. Cl.
CPC .......... *B60W 50/029* (2013.01); *B60W 10/08* (2013.01); *B60W 10/10* (2013.01); *B60W 10/20* (2013.01); *B60W 30/06* (2013.01); *B60W 30/09* (2013.01); *B60W 2050/0292* (2013.01); *B60W 2510/1005* (2013.01); *B60W 2510/188* (2013.01); *B60W 2510/242* (2013.01); *B60W 2556/45* (2020.02); *B60W 2710/083* (2013.01); *B60W 2710/1005* (2013.01); *B60W 2710/20* (2013.01)

(58) Field of Classification Search
None
See application file for complete search history.

(56) References Cited

U.S. PATENT DOCUMENTS

| | | | | |
|---|---|---|---|---|
| 2020/0189613 | A1* | 6/2020 | Moon | B60W 50/12 |
| 2020/0391707 | A1* | 12/2020 | Hollowell | F16H 63/3483 |

FOREIGN PATENT DOCUMENTS

| | | | | | |
|---|---|---|---|---|---|
| CN | 100404340 | C | * | 7/2008 | B60K 6/365 |
| CN | 108216192 | A | * | 6/2018 | B60K 6/442 |
| CN | 108779724 | A | * | 11/2018 | B60W 10/06 |
| CN | 110562246 | A | * | 12/2019 | |
| CN | 110871837 | A | * | 3/2020 | B60D 1/245 |
| CN | 112406896 | A | * | 2/2021 | B60W 30/06 |
| JP | 2004204957 | A | * | 7/2004 | B60K 6/365 |
| JP | 3852402 | B2 | * | 11/2006 | B60K 6/365 |
| WO | WO-2014207265 | A1 | * | 12/2014 | F16H 1/321 |

* cited by examiner

*Primary Examiner* — Shelley Chen
(74) *Attorney, Agent, or Firm* — Morgan, Lewis & Bockius LLP

(57) ABSTRACT

A remote parking control system and a fail-safe method thereof may include at least one controller and a remote parking control apparatus that performs braking control according to motor reverse torque control and transmission stage control, when a braking controller among the at least one controller fails, upon remote parking control.

17 Claims, 9 Drawing Sheets

| FAILURE | ROAD SURFACE | NO USE MOTOR REVERSE TORQUE (EX: INTERNAL COMBUSTION ENGINE) | USE MOTOR REVERSE TORQUE (EX: HEV, EV, FCEV) |
|---|---|---|---|
| BRAKING CONTROL IMPOSSIBLE STATE | FLATLAND | OCCURRENCE OF FAILURE / BRAKING DISTANCE | OCCURRENCE OF FAILURE / BRAKING DISTANCE |
| | SLOPE | OCCURRENCE OF FAILURE / BRAKING DISTANCE | OCCURRENCE OF FAILURE / BRAKING DISTANCE |

REMOTE PARKING CONTROL SYSTEM AND FAIL-SAFE METHOD THEREOF

CROSS-REFERENCE TO RELATED APPLICATION

The present application claims priority to Korean Patent Application No. 10-2021-0088004, filed on Jul. 5, 2021, the entire contents of which is incorporated herein for all purposes by this reference.

BACKGROUND OF THE INVENTION

Field of the Invention

The present invention relates to a remote parking control system and a fail-safe method thereof, and more particularly, relates to technologies corresponding to the fail-safe upon remote parking control.

Description of Related Art

Recently, as there has been an increase in demand for safety and convenience of a driver as well as performance of a vehicle, an advanced driver assist system (ADAS) assisting to control the vehicle based on information obtained by sensors or the like loaded into the vehicle has been applied to assist the driver while driving.

An automatic parking technology such as a remote smart parking assist (RSPA) is a convenience function with high driver's sensitivity and has a trend that becomes more common in vehicle applications.

A conventional automatic remote parking control apparatus controls a vehicle remotely in the outside of the vehicle. Accordingly, when a braking cooperation control device abnormally operates during vehicle control in the outside, an accident may occur because the braking cooperation control device does not perform a braking request. However, because the driver is located outside the vehicle, he or she may not respond at all.

In other words, in a failure situation where a braking system does not perform a normal operation during the operation of the automatic remote parking control function, although the cooperation control device takes safety measures (driving: idle torque control, shift: N/P stage control for each vehicle speed), safety of the vehicle may fail to be ensured without braking control of the braking system in a limited situation such as a downhill.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a remote parking control system for ensuring an additional braking method using motor reverse torque control of an electrification vehicle (e.g., an HEV, an EV, or FCEV) to ensure safety upon automatic remote parking control and a fail-safe method thereof.

The technical problems to be solved by the present invention are not limited to the aforementioned problems, and any other technical problems not mentioned herein will be clearly understood from the following description by those skilled in the art to which various exemplary embodiments of the present invention pertains.

According to various aspects of the present invention, a remote parking control system may include at least one controller and a remote parking control apparatus that performs braking control according to motor reverse torque control and transmission stage control, when a braking controller among the at least one controller fails, upon remote parking control.

In various exemplary embodiments of the present invention, the remote parking control apparatus may request controllers being in a normal state among the at least one controller to perform a fail-safe operation, when receiving a failure state information from the braking controller.

In various exemplary embodiments of the present invention, the remote parking control apparatus may determine a target deceleration and may determine an amount of motor reverse torque using the determined target deceleration.

In various exemplary embodiments of the present invention, the remote parking control apparatus may request a driving controller and a transmission controller among the at least one controller to control a target driving torque and a transmission stage, depending on whether it is possible to use a reverse torque.

In various exemplary embodiments of the present invention, the remote parking control apparatus may determine the target deceleration depending on whether there is a surrounding obstacle and whether there is a probability of colliding with the surrounding obstacle.

In various exemplary embodiments of the present invention, the remote parking control apparatus may receive information indicating whether it is possible to use the reverse torque from the driving controller among the at least one controller.

In various exemplary embodiments of the present invention, the driving controller may be configured to determine whether it is possible to use the reverse torque using a battery state and a current transmission stage.

In various exemplary embodiments of the present invention, the driving controller may correct the reverse torque using vehicle specifications and a road environment.

In various exemplary embodiments of the present invention, the remote parking control apparatus may transmit the reverse torque to the driving controller and may request the transmission controller to maintain a current transmission stage, when it is possible to use the reverse torque.

In various exemplary embodiments of the present invention, the remote parking control apparatus may request the transmission controller to change the current transmission stage without transmitting the reverse torque to the driving controller, when it is impossible to use the reverse torque.

In various exemplary embodiments of the present invention, the remote parking control apparatus may request a steering controller among the at least one controller to stop steering control.

In various exemplary embodiments of the present invention, the remote parking control apparatus may request a remote controller among the at least one controller to control starting of a vehicle, when it is identified that a current transmission stage of the vehicle engages with a P stage or an electronic parking break (EPB).

In various exemplary embodiments of the present invention, the remote parking control apparatus may request the remote controller to turn off the starting of the vehicle, when the current transmission stage is the P stage, and may request the remote controller to maintain the starting of the vehicle, when the current transmission stage is a stage except for the P stage.

In various exemplary embodiments of the present invention, the braking controller may perform hydraulic control and EPB engaging at a same time for a fail-safe operation.

In various exemplary embodiments of the present invention, the remote parking control apparatus may transmit failure state information to the at least one controller, when it is determined that the remote parking control apparatus fails. The at least one controller may perform its own fail-safe operation, when receiving the failure state information from the remote parking control apparatus.

In various exemplary embodiments of the present invention, a driving controller among the at least one controller may be configured to determine whether it is possible to use a reverse torque based on a battery state and a current transmission stage, may correct a motor reverse torque based on vehicle specifications and a road environment, when it is possible to use the reverse torque, and may output a driving torque as "0", when it is impossible to use the reverse torque.

In various exemplary embodiments of the present invention, the braking controller among the at least one controller may perform hydraulic control and EPB engaging at the same time, when receiving the failure state information from the remote parking control apparatus.

In various exemplary embodiments of the present invention, the remote parking control apparatus may transmit a target deceleration to the braking controller being in a normal state among the at least one controller and may request the braking controller to engage with an EPB, when it is identified that a vehicle is stopped, may request a transmission controller being in the normal state among the at least one controller to control a transmission stage depending on whether it is possible to use a reverse torque, and may request a steering controller being in the normal state among the at least one controller to stop steering control, and may request a remote controller being in the normal state among the at least one controller to control starting of the vehicle, when a driving controller among the at least one controller fails.

In various exemplary embodiments of the present invention, the remote parking control apparatus may request the transmission controller to maintain a current transmission stage to use the reverse torque, when it is possible to use the reverse torque, and may request the transmission controller to control an N stage to block a driving force, when it is impossible to use the reverse torque.

According to various aspects of the present invention, a remote parking control method may include determining whether one of at least one controller and a remote parking control apparatus fails, upon the remote parking control and performing braking control according to motor reverse torque control and transmission stage control, when a braking controller among the at least one controller fails.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
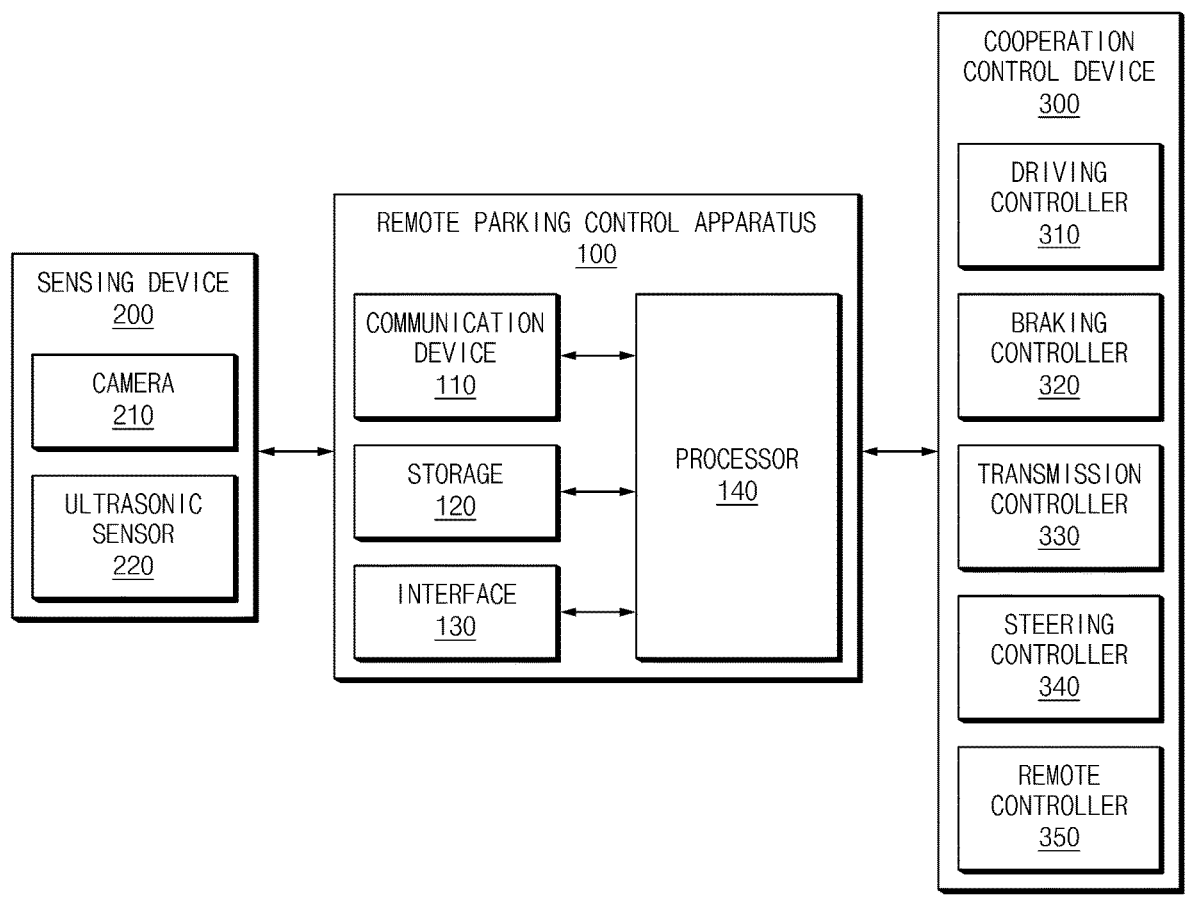
FIG. 1 is a block diagram illustrating a configuration of a vehicle system including a remote parking control apparatus according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present invention will be described in detail with reference to FIG. 1, FIG. 2, FIG. 3, FIG. 4, FIG. 5, FIG. 6, FIG. 7, FIG. 8 and FIG. 9.

FIG. 1 is a block diagram illustrating a configuration of a vehicle system including a remote parking control apparatus according to various exemplary embodiments of the present invention.

Referring to FIG. 1, the vehicle system according to various exemplary embodiments of the present invention may include a remote parking control apparatus 100, a sensing device 200, and a cooperation control device 300.

The remote parking control apparatus 100 according to various exemplary embodiments of the present invention may be implemented in a vehicle. In the instant case, the remote parking control apparatus 100 may be integrally configured with control units in the vehicle or may be implemented as a separate device to be connected to the control units of the vehicle by a separate connection means.

The remote parking control apparatus 100 may include a remote smart parking assist (RSPA) or the like. The RSPA may predict and determine a time to collision such that braking control operates in advance to prevent collision. There may be a problem when a braking controller or the like fails.

When it is determined that the remote parking control apparatus 100 fails, the remote parking control apparatus 100 may request the cooperation control device 300 to perform its own fail-safe operation.

When one of the controllers included in the cooperation control device 300 fails, the remote parking control apparatus 100 may perform a fail-safe operation of the remote parking control apparatus 100 or may request the controllers, which do not fail, to perform a fail-safe operation.

Upon remote parking control, when the braking controller 320 among at least one controller included in the cooperation control device 300 fails, the remote parking control apparatus 100 may perform braking control according to motor reverse torque control and transmission stage control.

Referring to FIG. 1, the remote parking control apparatus 100 may include a communication device 110, a storage 120, an interface 130, and a processor 140.

The communication device 110 may be a hardware device implemented with various electronic circuits to transmit and receive a signal through a wireless or wired connection, which may transmit and receive information with devices in the vehicle based on a network communication technology in the vehicle. As various exemplary embodiments of the present invention, the network communication technology in the vehicle may include controller area network (CAN) communication, local interconnect network (LIN) communication, flex-ray communication, or the like.

Furthermore, the communication device 110 may communicate with devices outside the vehicle through a wireless Internet technology or a short range communication technology. Herein, the wireless Internet technology may include wireless local area network (WLAN), wireless broadband (WiBro), wireless-fidelity (Wi-Fi), Worldwide Interoperability for Microwave Access (WiMAX), or the like. Furthermore, the short range communication technology may include Bluetooth, ZigBee, ultra wideband (UWB), radio frequency identification (RFID), infrared data association (IrDA), or the like. As various exemplary embodiments of the present invention, the communication device 110 may perform wireless communication with a smart key and a remote control device outside the vehicle, upon remote parking control.

The storage 120 may store a sensing result of the sensing device 200 and data, an algorithm, and/or the like necessary for an operation of the processor 140. As various exemplary embodiments of the present invention, the storage 120 may store an algorithm for a fail-safe operation.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The interface 130 may include an input means for receiving a control command from a user and an output means for outputting an operation state, an operation result, or the like of the remote parking control apparatus 100. Herein, the input means may include a key button and may further include a mouse, a joystick, a jog shuttle, a stylus pen, or the like. Furthermore, the input means may further include a soft key implemented on a display.

The interface 130 may be implemented as a head up display (HUD), a cluster, an audio video navigation (AVN), a human machine interface (HMI), a user setting menu (USM), or the like. As various exemplary embodiments of the present invention, the interface 130 may display a fail-safe operation state.

An output means may include a display and may further include a voice output means such as a speaker. In the instant case, when a touch sensor such as a touch film, a touch sheet, or a touch pad is provided in the display, the display may operate as a touchscreen and may be implemented in a form where the input means and the output means are integrated with each other.

In the instant case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The processor 140 may be electrically connected to the communication device 110, the storage 120, the interface 130, or the like and may electrically control the respective components. The processor 140 may be an electrical circuit which executes instructions of software and may perform a variety of data processing and determination described below.

The processor 140 may process a signal delivered between the respective components of the remote parking control apparatus 100 and may perform the overall control such that the respective components may normally perform their own functions.

The processor 140 may be implemented in a form of hardware, may be implemented in a form of software, or may be implemented in a form of a combination thereof. The processor 140 may be implemented as a microprocessor and may be, for example, an electronic control unit (ECU), a micro controller unit (MCU), or another sub-controller, which is loaded into the vehicle.

Upon remote parking control, when the braking controller 320 among the at least one controller included in the cooperation control device 300 fails, the processor 140 may perform braking control according to motor reverse torque control and transmission stage control.

When receiving a failure state information from the braking controller 320, the processor 140 may request the controllers 310, 330, 340, and 350 being in a normal state among the at least one controller included in the cooperation control device 300 to perform a fail-safe operation.

The processor 140 may determine a target deceleration and may determine an amount of motor reverse torque using the determined target deceleration. Furthermore, the processor 140 may determine a target deceleration depending on whether there is a surrounding obstacle and whether there is a probability of colliding with the surrounding obstacle.

Furthermore, the processor 140 may receive information indicating whether it is possible to use a reverse torque from the driving controller 310 among the at least one controller included in the cooperation control device 300 to identify whether it is possible to use the reverse torque. When it is possible to use the reverse torque, the processor 140 may transmit the reverse torque to the driving controller 310 and may request the transmission controller 330 to maintain a current transmission stage.

Meanwhile, when it is impossible to use the reverse torque, the processor 140 may request the transmission controller 330 to change the current transmission stage without transmitting the reverse torque to the driving controller 310. For example, the processor 140 may transmit the reverse torque as "0" and may request the transmission controller 330 to change the current transmission stage to an N stage, when the current transmission stage is a Da stage.

Furthermore, in the situation where the braking controller 320 fails, the processor 140 may request the steering controller 340 among the at least one controller included in the cooperation control device 300 to stop steering control.

Furthermore, when it is identified that the current transmission stage engages with a P stage or an electronic parking break (EPB), the processor 140 may request the remote controller 350 among the at least one controller included in the cooperation control device 300 to control starting of the vehicle. In the instant case, the processor 140 may request the remote controller 350 to control starting of the vehicle when in a remote control mode.

When the current transmission stage is the P stage, the processor 140 may request the remote controller 350 to turn off the starting of the vehicle. When the current transmission stage is a stage except for the P stage, the processor 140 may request the remote controller 350 to maintain the starting of the vehicle.

When the driving controller 310 among the at least one controller included in the cooperation control device 300 fails, the processor 140 may transmit the target deceleration to the braking controller 320 being in the normal state among the at least one controller included in the cooperation control device 300 and may request the braking controller 320 to engage with the EPB, when it is identified that the vehicle is stopped. Furthermore, the processor 140 may request the transmission controller 330 being in the normal state to control a transmission stage depending on whether it is possible to use a reverse torque, may request the steering controller 340 being in the normal state to stop steering control, and may request the remote controller 350 being in the normal state to control starting of the vehicle.

The processor 140 may request the transmission controller 330 to maintain a current transmission stage to use a reverse torque, when it is possible to use the reverse torque, and may request the transmission controller 330 to control an N stage to block a driving force, when it is impossible to use the reverse torque.

When the braking controller 320 fails, the processor 140 may transmit the reverse torque to the driving controller 310 and may control a transmission stage, depending on whether it is possible to use the reverse torque. In other words, the processor 140 may transmit the reverse torque to the driving controller 310, when it is possible to use the reverse torque, and may request the transmission controller 330 to maintain the D/R stage which is the current transmission stage.

When the steering controller 340 fails, the processor 140 may determine a target deceleration, may determine a reverse torque using the target deceleration, may provide a braking request to the braking controller 320, depending on whether it is possible to use the reverse torque, and may request the transmission controller 330 to control a transmission stage. Furthermore, when it is identified that the transmission stage engages with the P stage or an EPB, the processor 140 may request the remote controller 350 to control starting of the vehicle.

Furthermore, when the remote controller 350 fails, the processor 140 may determine a target deceleration, may determine a reverse torque using the target deceleration, may provide a braking request to the braking controller 320, depending on whether it is possible to use the reverse torque, and may request the transmission controller 330 to control a transmission stage. Furthermore, the processor 140 may request to the steering controller 340 to stop steering control.

When it is determined that the remote parking control apparatus 100 fails, the processor 140 may transmit failure state information to at least one controller included in the cooperation control device 300. The at least one controller included in the cooperation control device 300 may receive the failure state information from the remote parking control apparatus 100 and may perform its own fail-safe operation.

The sensing device 200 may detect a vehicle speed, whether there is a surrounding obstacle, a probability of colliding with the surrounding obstacle, or the like. To the present end, the sensing device 200 may include a camera 210 and an ultrasonic sensor 220 and may further include a radar, a light detection and ranging (LiDAR), or the like.

The cooperation control device 300 may include the driving controller 310, the braking controller 320, the steering controller 340, the remote controller 350, or the like.

The driving controller 310 may be configured to control to drive an engine of the vehicle and may include a controller configured for controlling a speed of the vehicle. The driving controller 310 may determine whether it is possible to use a reverse torque, using a battery state and a current transmission stage.

The driving controller 310 may correct a reverse torque using vehicle specifications and a road environment. The driving controller 310 may determine whether it is possible to use a reverse torque, using a battery state and a current transmission stage. The driving controller 310 may set an initial motor reverse torque value with regard to a weight of an empty vehicle and may correct a motor reverse torque based on vehicle specifications (e.g., a vehicle speed) and a road environment (e.g., a slope way), when it is possible to use the reverse torque, and may output a driving torque as "0", when it is impossible to use the reverse torque.

The braking controller 320 may be configured to control braking of the vehicle and may include a controller configured for controlling a brake. When receiving the failure state information from the remote parking control apparatus 100, the braking controller 320 may perform hydraulic control and EPB engaging at the same time. The braking controller 320 may determine a target deceleration depending on a current vehicle speed and information indicating whether it is possible to use a driving reverse torque.

When receiving the failure state information of the remote parking control apparatus 100, the transmission controller 330 may control a transmission stage depending on the information indicating whether it is possible to use the reverse torque. In other words, the transmission controller 330 may maintain a current transmission stage, when it is possible to use a reverse torque, and may adjust or maintain the current transmission stage, when it is impossible to use the reverse torque. For example, the transmission controller 330 may shift the transmission stage to the N stage, when the current transmission stage is a D/R stage, may maintain the current transmission stage, when the current transmission stage is an N/P stage, and may engage the transmission stage with the P stage, when the vehicle arrives at a vehicle speed where it is possible for the transmission stage to engage with the P stage.

The steering controller 340 may be configured to control a steering angle of the vehicle and may include a steering wheel, an actuator interlocked with the steering wheel, and a controller configured for controlling the actuator.

When receiving the failure state information from the remote parking control apparatus 100, the steering controller 340 may stop steering control.

The remote controller 350 may be configured to remotely control the vehicle in the outside of the vehicle. When receiving the failure state information from the remote parking control apparatus 100, the remote controller 350 may control a starting state depending on a transmission stage. For example, the remote controller 350 may turn off starting of the vehicle, when the transmission stage is the P stage, and may maintain starting of the vehicle, when the transmission stage is not the P stage. In the instant case, the remote controller 350 may perform remote cooperation control, when a driver enables a remote parking control function in the outside of the vehicle, and may fail to perform cooperation control, when the driver enables the remote parking control function in the interior of the vehicle.

Accordingly, an exemplary embodiment of the present invention may ensure a braking force when it is impossible to perform braking control, using motor reverse torque control of an electrification vehicle (e.g., a hybrid electric vehicle (HEV), an electric vehicle (EV), or a fuel cell electric vehicle (FCEV)), thus facilitating stopping of the vehicle and shortening a braking distance.

Figure 2:
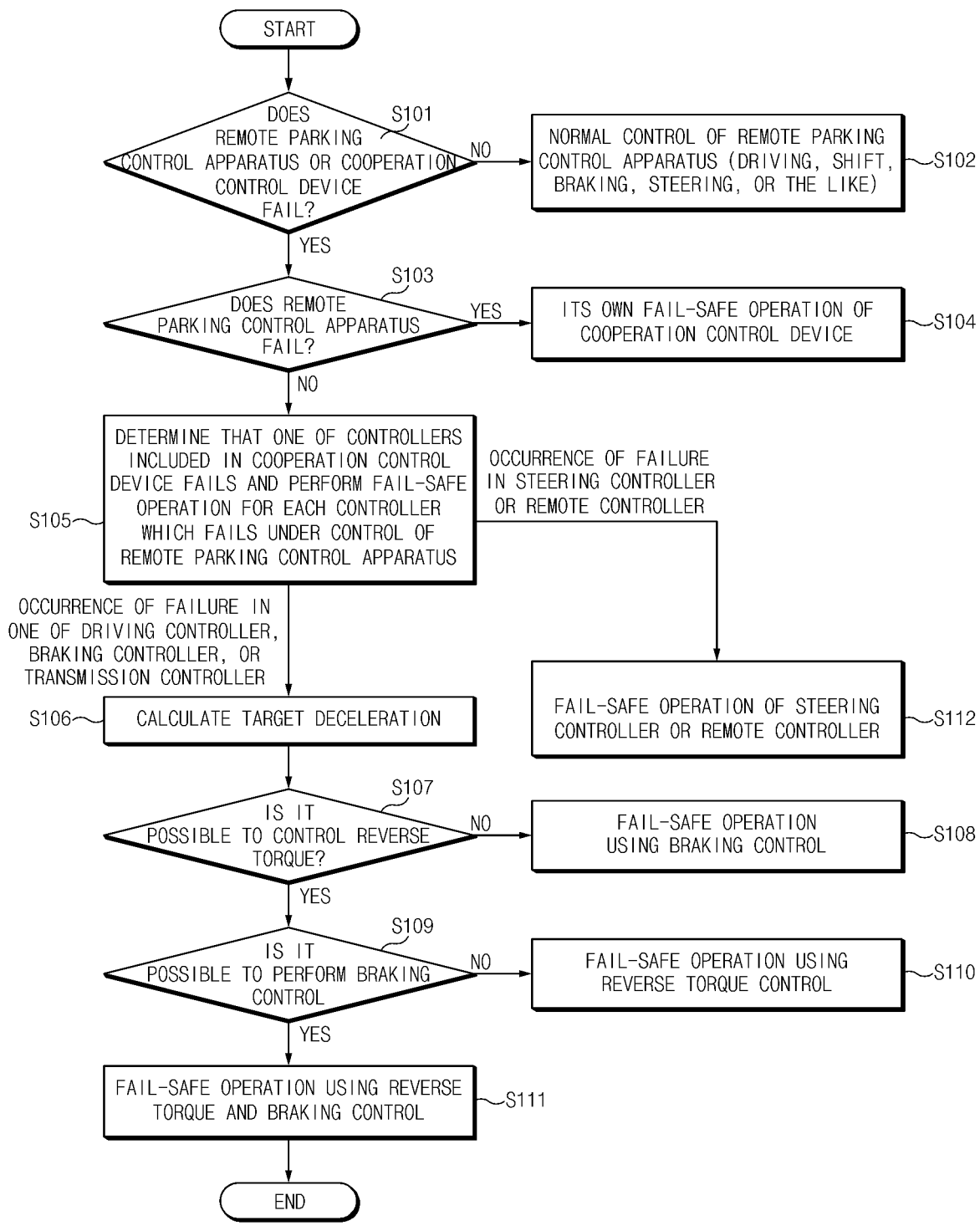
FIG. 2 is a flowchart illustrating a fail-safe method of a remote parking control apparatus according to various exemplary embodiments of the present invention.

Hereinafter, a description will be provided in detail of a fail-safe method of a remote parking control apparatus according to various exemplary embodiments of the present invention with reference to FIG. 2. FIG. 2 is a flowchart illustrating a remote parking control method according to various exemplary embodiments of the present invention.

Hereinafter, it is assumed that a remote parking control apparatus 100 of FIG. 1 performs a process of FIG. 2. Furthermore, in a description of FIG. 2, an operation referred to as being performed by the remote parking control apparatus 100 may be understood as being controlled by a processor 140 of the remote parking control apparatus 100.

Referring to FIG. 2, in S101, the remote parking control apparatus 100 may determine whether a remote parking control function of the remote parking control apparatus 100 is released or whether the remote parking control apparatus 100 or a cooperation control device 300 fails. In the instant case, the remote parking control apparatus 100 may receive failure state information from the cooperation control device 300 and may identify whether there is a failure in the cooperation control device 300.

When the remote parking control function is not released or when the remote parking control apparatus 100 or the cooperation control device 300 does not fail, in S102, the remote parking control apparatus 100 may perform normal remote parking control.

When the remote parking control function is released or when the remote parking control apparatus 100 or the cooperation control device 300 fails, in S103, the remote parking control apparatus 100 may determine that the current failure is a failure in the remote parking control apparatus 100.

Upon the failure in the remote parking control apparatus 100, in S104, the remote parking control apparatus 100 may transmit the failure state information to the cooperation control device 300 and may request the cooperation control device 300 to perform its own fail-safe operation of the cooperation control device 300. The fail-safe operation process when the remote parking control apparatus 100 fails will be described in detail below with reference to FIG. 3.

On the other hand, when there is no failure in the remote parking control apparatus 100, in S105, the remote parking control apparatus 100 may determine that one of controllers included in the cooperation control device 300 fails and may request the controller being in a normal state to perform a fail-safe operation.

When one of a driving controller 310, a braking controller 320, or a transmission controller 330 of FIG. 1 fails, in S106, the remote parking control apparatus 100 may determine a target deceleration depending on whether there is a probability of colliding with a surrounding obstacle. In S107, the remote parking control apparatus 100 may identify information indicating whether it is possible to control a reverse torque, which is received from the driving controller 310.

When it is impossible to control the reverse torque, in S108, the remote parking control apparatus 100 may perform a fail-safe operation using braking control. In the instant case, the driving controller 310 may not output a motor torque.

Meanwhile, when it is possible to control the reverse torque, in S109, the remote parking control apparatus 100 may determine whether it is possible to perform braking control. When it is impossible to perform the braking control, in S110, the remote parking control apparatus 100 may perform a fail-safe operation using reverse torque control. When it is possible to perform the braking control, in S111, the remote parking control apparatus 100 may perform a fail-safe operation using the reverse torque control and the braking control In the instant case, when it is possible to use the reverse torque, the driving controller 310 may set an initial value of the amount of motor reverse torque with regard to a weight of an empty vehicle and may correct the amount of motor reverse torque depending on vehicle specifications (e.g., a vehicle speed) and a road environment (e.g., a slope or the like).

The fail-safe operation when one of the driving controller 310, the braking controller 320, or the transmission controller 330 fails will be described in detail below with reference to FIG. 4, FIG. 5 and FIG. 6.

When a steering controller 340 or a remote controller 350 fails, the remote parking control apparatus 100 may request the other controllers being in a normal state to take safety measures. In S112, the steering controller 340 or the remote controller 350 may perform its own fail-safe operation. The fail-safe process when the steering controller 340 or the remote controller 350 fails will be described in detail below with reference to FIG. 7.

Figure 3:
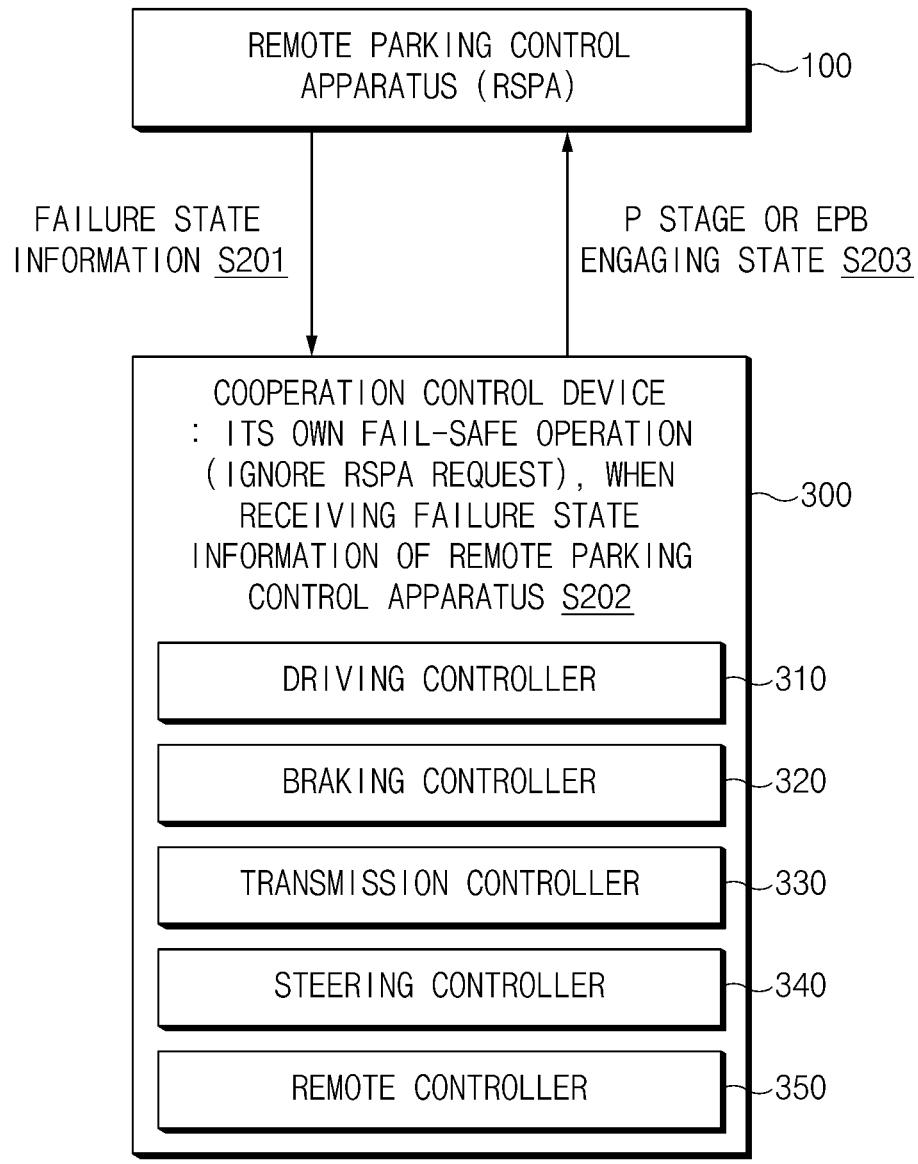
FIG. 3 is a drawing illustrating its own fail-safe operation method of a cooperation control device when a remote smart parking assist (RSPA) fails according to various exemplary embodiments of the present invention.

FIG. 3 is a drawing illustrating its own fail-safe operation method of a cooperation control device 300 when a remote parking control apparatus 100 (an RSPA) fails according to various exemplary embodiments of the present invention.

Referring to FIG. 3, in S201, a remote parking control apparatus 100 may communicate with the cooperation control device 300 and may transmit failure state information to the cooperation control device 300, when the remote parking control apparatus 100 fails.

Thus, in S202, the cooperation control device 300 may perform its own fail-safe operation.

When receiving the failure state information of the remote parking control apparatus 100, the cooperation control device 300 may perform its own fail-safe operation. In the instant case, the cooperation control device 300 may ignore a request of the remote parking control apparatus 100.

Its own fail-safe operation of the cooperation control device 300 will be described in detail below.

A driving controller 310 of FIG. 1 may determine whether to use a reverse torque, with regard to a battery state and a current transmission stage. For example, the driving controller 310 may determine to use the reverse torque, when the transmission stage is a D stage or an R stage, and may determine not to use the reverse torque, when the transmission stage is an N stage or a P stage.

When it is possible to use the reverse torque, the driving controller 310 may set an initial motor reverse torque value with regard to a weight of an empty vehicle and may correct the amount of motor reverse torque depending on a current vehicle speed, a slope, or the like.

On the other hand, when it is impossible to use the reverse torque, the driving controller 310 may output a driving torque as "0".

Furthermore, when receiving the failure state information of the remote parking control apparatus 100, the braking controller 320 may perform hydraulic control and EPB engaging at the same time. Furthermore, the braking controller 320 may determine a target deceleration depending on a current vehicle speed and information indicating whether it is possible to use a driving reverse torque.

When receiving the failure state information of the remote parking control apparatus 100, the transmission controller 330 may control a transmission stage depending on the information indicating whether it is possible to use the reverse torque.

When it is possible to use the reverse torque, the transmission controller 330 may maintain a current transmission stage.

When it is impossible to use the reverse torque, the transmission controller 330 may shift the transmission stage to an N stage, when the current transmission stage is a D/R stage, and may maintain the current transmission stage, when the current transmission stage is an N/P stage.

Furthermore, when the vehicle arrives at a vehicle speed where it is possible for the transmission stage to engage with the P stage, the transmission controller 330 may engage the transmission stage with the P stage.

When receiving the failure state information of the remote parking control apparatus 100, the steering controller 340 may stop steering control.

The remote controller 350 may control a starting state depending on a transmission stage. In other words, the remote controller 350 may turn off starting of the vehicle, when the transmission stage is the P stage, and may maintain starting of the vehicle, when the transmission stage is one of the other stages except for the P stage. Furthermore, the remote controller 350 may perform remote cooperation control, only when a driver performs an operation of the remote parking control apparatus 100 in the outside of the vehicle. In the instant case, the remote controller 350 may not perform remote cooperation control, when the driver performs an operation of the remote parking control apparatus 100 in the interior of the vehicle.

In S203, when receiving a notification of a state where the P stage or EPB engaging of the transmission stage is completed from the cooperation control device 300, the remote parking control apparatus 100 may end the remote parking control mode.

Figure 4:
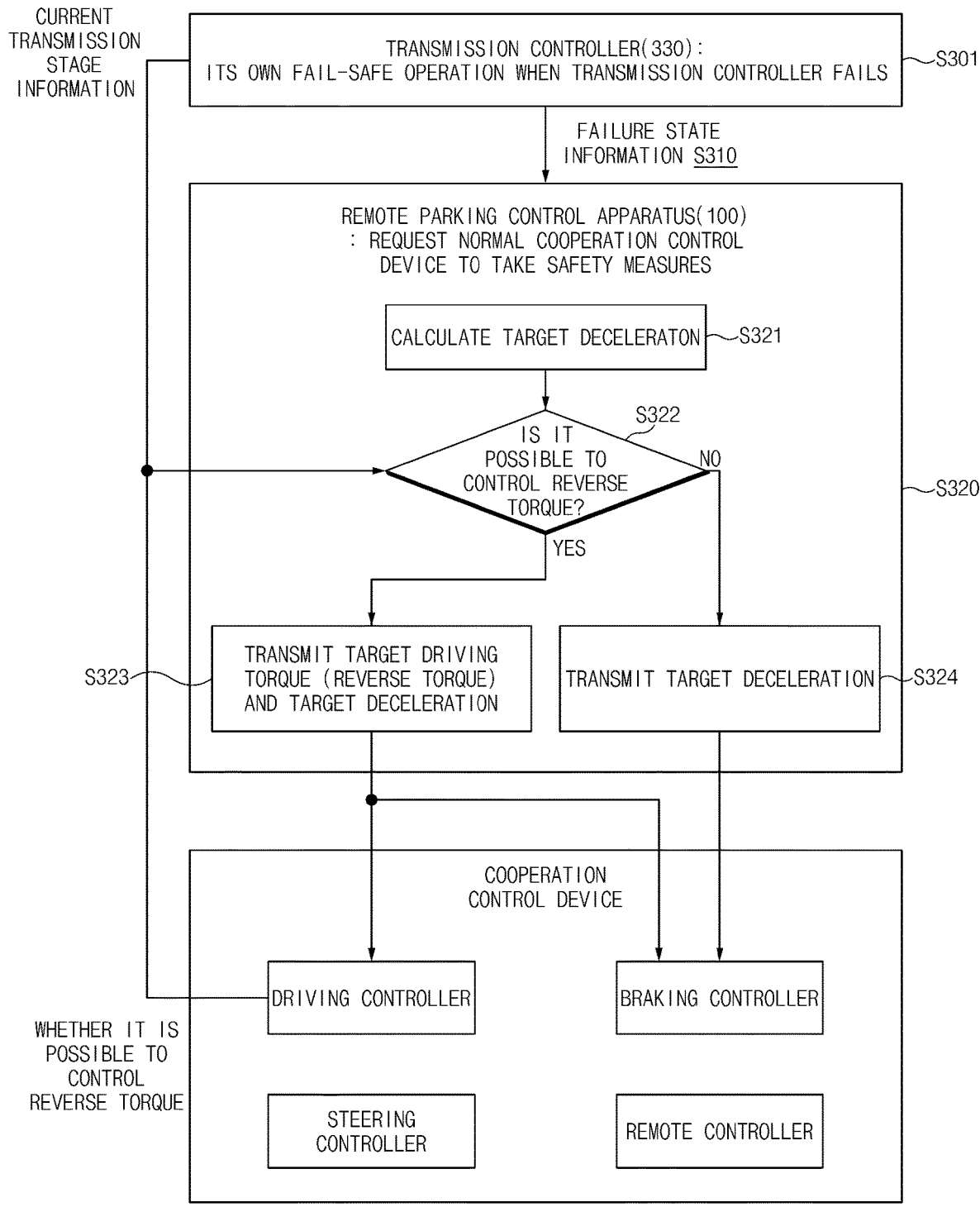
FIG. 4 is a drawing illustrating a fail-safe operation method when a transmission controller fails according to various exemplary embodiments of the present invention.

FIG. 4 is a drawing illustrating a fail-safe operation method when a transmission controller fails according to various exemplary embodiments of the present invention.

Referring to FIG. 4, in S301, a transmission controller 330 may perform its own fail-safe operation, when there is a failure in the transmission controller 330. In S310, the transmission controller 330 may transmit failure state information to a remote parking control apparatus 100. In the instant case, the transmission controller 330 may maintain a current transmission stage and may engage the transmission stage with a P stage, when a vehicle arrives at a vehicle speed where it is possible for the transmission stage to engage with the P stage.

When receiving the failure state information from the transmission controller 330, in S320, the remote parking control apparatus 100 may request controllers 310, 320, 330, and 350 being in a normal state, except for the transmission controller 330 which fails, to perform a fail-safe operation.

In S321, the remote parking control apparatus 100 may determine a target deceleration depending on whether there is a probability of colliding with a surrounding obstacle. In the instant case, the remote parking control apparatus 100 may determine whether there is a probability of colliding with a surrounding obstacle, based on information detected by a sensing device 200 of FIG. 1.

In S322, the remote parking control apparatus 100 may receive information indicating whether it is possible to use control a reverse torque from the driving controller 310 and may identify whether it is possible to control the reverse torque.

In the instant case, the driving controller 310 may determine whether it is possible to use the reverse torque, depending on a current transmission stage.

Thereafter, the remote parking control apparatus 100 may provide a braking request depending on whether it is possible to control the reverse torque.

In other words, when it is possible to control the reverse torque, in S323, the remote parking control apparatus 100 may transmit the target driving torque (the reverse torque) and the target deceleration to the driving controller 310 and the braking controller 320.

On the other hand, when it is impossible to control the reverse torque, in S324, the remote parking control apparatus 100 may transmit the target deceleration to the braking controller 320. Furthermore, when it is identified that the vehicle is stopped, the remote parking control apparatus 100 may request the braking controller 320 to engage with an EPB.

Furthermore, when receiving the failure state information, the remote parking control apparatus 100 may request the steering controller 340 to stop steering control.

When it is identified that the transmission stage engages with a P stage or the EPB in a remote control mode, the remote parking control apparatus 100 may request the remote controller 350 to control starting of the vehicle. For example, the remote parking control apparatus 100 may request the remote controller 350 to turn off starting of the vehicle, when the transmission stage is the P stage, and may request the remote controller 350 to maintain starting of the vehicle, when the transmission stage is a stage except for the P stage. In the instant case, when the driver performs remote parking control in the outside of the vehicle, the remote controller 350 may perform remote cooperation control. In other words, when the driver executes a remote parking control mode in the interior of the vehicle, the remote controller 350 may be configured not to perform cooperation control.

The driving controller 310 may determine whether it is possible to control a reverse torque and may transmit the determined result to the remote parking control apparatus 100. Furthermore, the driving controller 310 may control a driving torque depending on a request of the remote parking control apparatus 100 for a fail-safe operation.

The braking controller 320 may perform braking control and EPB engaging depending on a request of the remote parking control apparatus 100.

The steering controller 340 may stop steering control depending on a request of the remote parking control apparatus 100.

The remote controller 350 may control starting of the vehicle depending on a request of the remote parking control apparatus 100 in a remote control mode.

Figure 5:
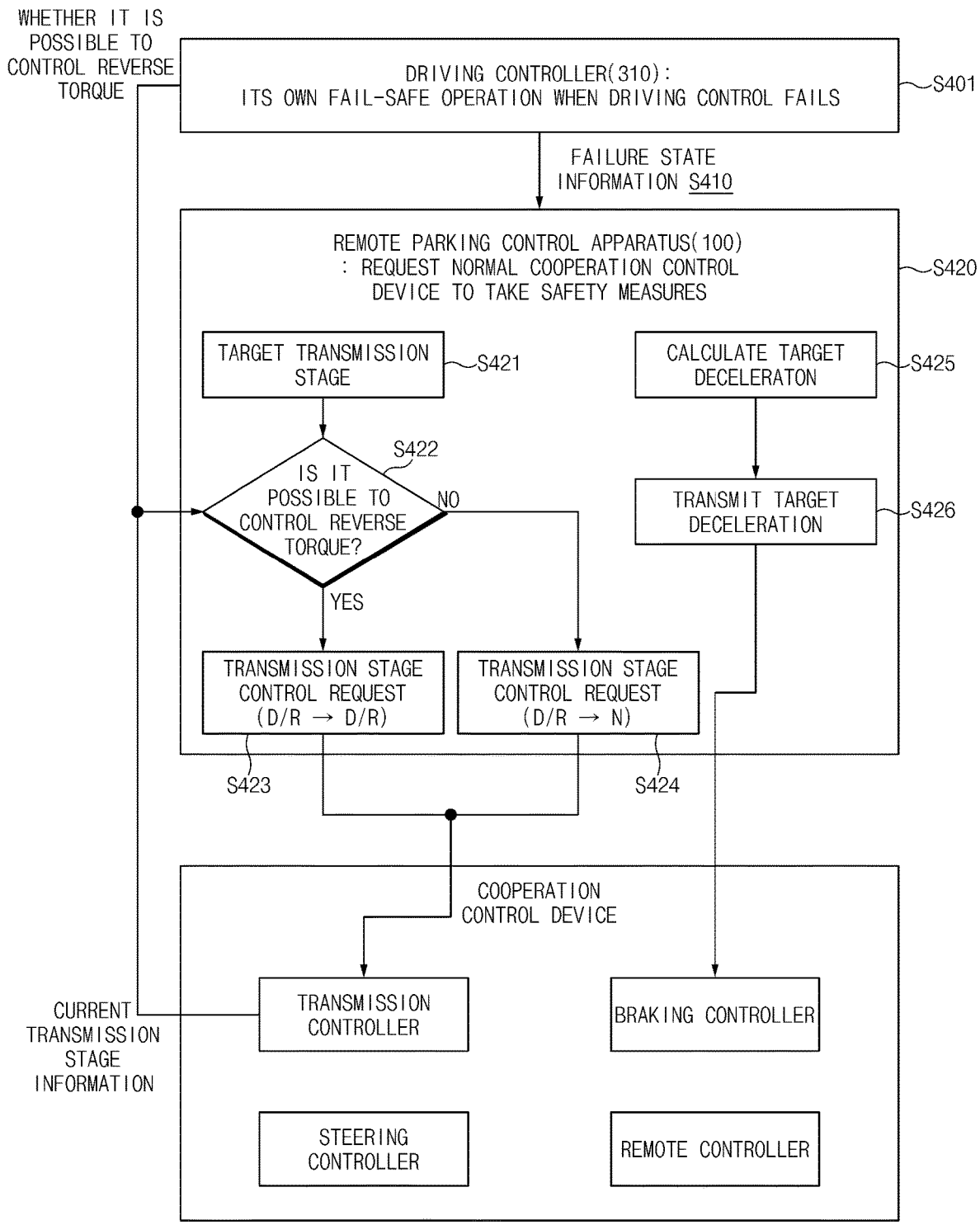
FIG. 5 is a drawing illustrating a fail-safe operation method when a driving controller fails according to various exemplary embodiments of the present invention.

FIG. 5 is a drawing illustrating a fail-safe operation method when a driving controller fails according to various exemplary embodiments of the present invention.

Referring to FIG. 5, in S401, a driving controller 310 may perform its own fail-safe operation, when there is a failure in the driving controller 310. In other words, for its own fail-safe operation, the driving controller 310 may output a reverse torque, when it is possible to use the reverse torque, and may output a driving torque as "0", when it is impossible to use the reverse torque.

In S410, the driving controller 310 may transmit failure state information to the remote parking control apparatus 100.

When receiving the failure state information from the driving controller 310, in S420, the remote parking control apparatus 100 may request a braking controller 320, a transmission controller 330, a steering controller 340, a remote controller 350, and the like being in a normal state to perform a fail-safe operation.

To control a target transmission stage in S421, in S422, the remote parking control apparatus 100 may identify information indicating whether it is possible to use a reverse torque, which is received from the driving controller 310, and may request the transmission controller 330 to control a transmission stage depending on whether it is possible to use the reverse torque.

In other words, when it is possible to use the reverse torque, in S423, the remote parking control apparatus 100 may request the transmission controller 330 to maintain a current stage (D/R->D/R) to use the current stage. When it is impossible to use the reverse torque, in S424, the remote parking control apparatus 100 may request the transmission controller 330 to control an N stage (D/R->N, N/P->N/P) to block a driving force. Furthermore, the remote parking control apparatus 100 may request the transmission controller 330 to engage with a P stage, when it is identified that the vehicle is stopped. Thus, the transmission controller 330 may perform transmission control depending on a request of the remote parking control apparatus 100. Next, the transmission controller 330 may transmit current transmission stage information to the remote parking control apparatus 100.

Furthermore, in S425, the remote parking control apparatus 100 may determine a target deceleration depending on whether there is a probability of colliding with a surrounding obstacle. In S426, the remote parking control apparatus 100 may transmit the determined target deceleration to the braking controller 320. Furthermore, the remote parking control apparatus 100 may request the braking controller 320 to engage with an EPB, when it is identified that the vehicle is stopped. Thus, the braking controller 320 may perform braking control and EPB engaging depending on a request of the remote parking control apparatus 100 and may provide the result to the remote parking control apparatus 100.

Furthermore, when receiving the failure state information from the driving controller 310, the remote parking control apparatus 100 may request the steering controller 340 to stop steering control and may request the remote controller 350 to control starting of the vehicle, when it is identified that the transmission stage engages with the P stage or the EPB. For example, in a remote parking control mode, the remote parking control apparatus 100 may request the remote controller 350 to turn off starting of the vehicle, when the transmission stage is the P stage, and may request the remote controller 350 to maintain starting of the vehicle, when the transmission stage is a stage except for the P stage. Furthermore, the remote controller 350 may perform remote cooperation control, when a driver enters the remote parking control mode in the outside of the vehicle, and may fail to perform remote cooperation control, when the driver enters the remote parking control mode in the interior of the vehicle.

Thus, the steering controller 340 may perform steering control depending on a request of the remote parking control apparatus 100. Furthermore, the remote controller 350 may control starting of the vehicle depending on a request of the remote parking control apparatus 100.

Figure 6:
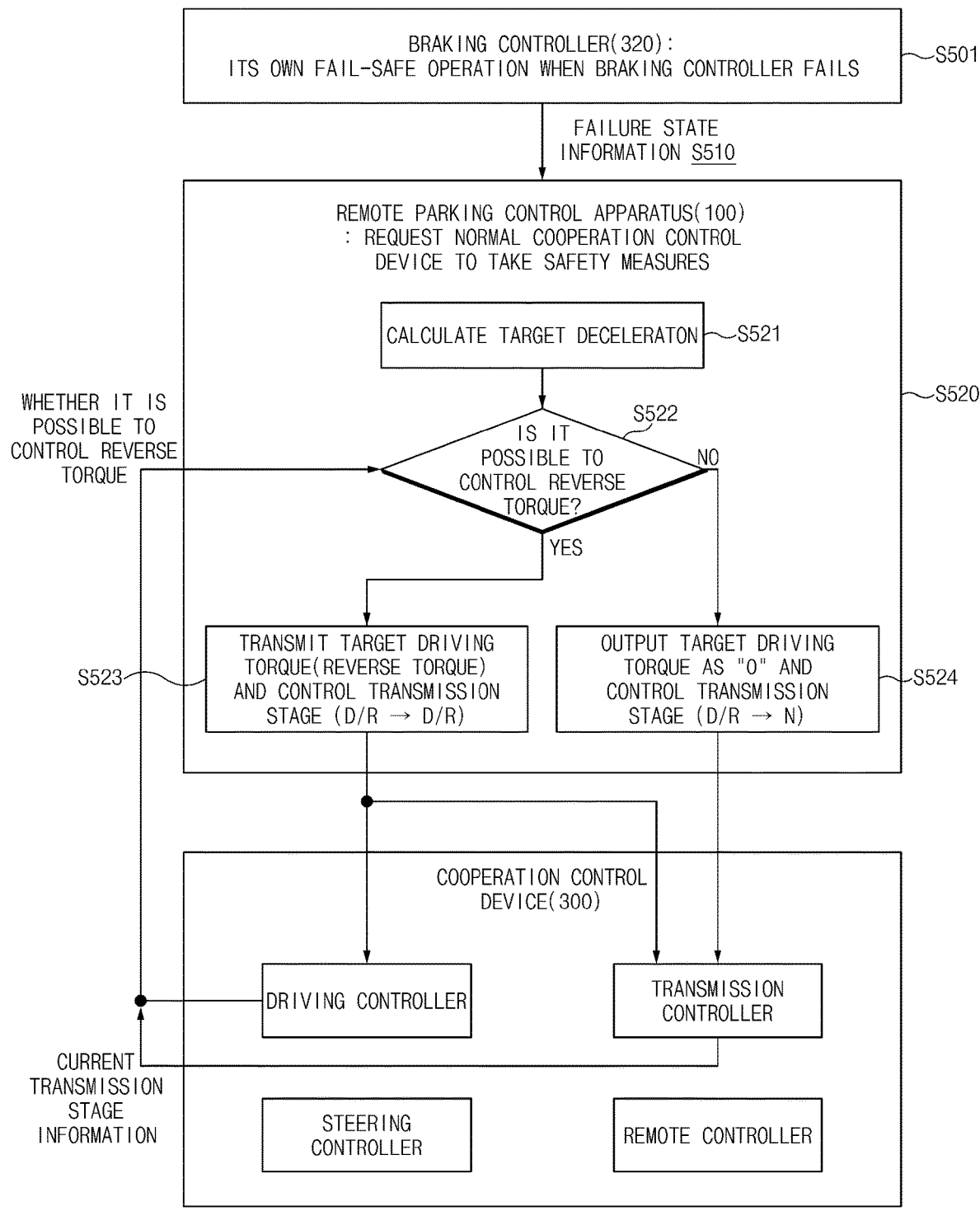
FIG. 6 is a drawing illustrating a fail-safe operation method when a braking controller fails according to various exemplary embodiments of the present invention.

FIG. 6 is a drawing illustrating a fail-safe operation method when a braking controller fails according to various exemplary embodiments of the present invention.

Referring to FIG. 6, in S501, a braking controller 320 may perform its own fail-safe operation, when there is a failure in the braking controller 320. In other words, for its own fail-safe operation, the braking controller 320 may perform hydraulic control and EPB engaging at the same time.

In S510, the braking controller 320 may transmit failure state information to the remote parking control apparatus 100.

When receiving the failure state information from the driving controller 310, in S520, the remote parking control apparatus 100 may request a driving controller 310, a transmission controller 330, a steering controller 340, a remote controller 350, and the like being in a normal state to perform a fail-safe operation.

First of all, in S521, the remote parking control apparatus 100 may determine a target deceleration depending on whether there is a probability of colliding with a surrounding obstacle.

In S522, the remote parking control apparatus 100 may identify information indicating whether it is possible to control a reverse torque, which is received from the driving controller 310, and may request the driving controller 310 to control a target driving torque and a transmission stage depending on whether it is possible to control the reverse torque. Thus, the driving controller 310 may control the driving torque depending on a request of the remote parking control apparatus 100.

In other words, when it is possible to use a reverse torque, in S523, the remote parking control apparatus 100 may transmit the target driving torque (the reverse torque) to the driving controller 310 and the transmission controller 330 and may request the transmission controller 330 to maintain shifting to a D/R stage. Thus, the transmission controller 330 may perform transmission control depending on a request of the remote parking control apparatus 100. Next, the transmission controller 330 may transmit current transmission stage information to the remote parking control apparatus 100.

When it is possible to use the reverse torque, in S523, the remote parking control apparatus 100 may transmit the target driving torque (the reverse torque) to the driving controller 310 and the transmission controller 330 and may request the transmission controller 330 to maintain shifting to a D/R stage.

On the other hand, when it is impossible to use the reverse torque, in S524, the remote parking control apparatus 100 may output the target driving torque as "0" to the transmission controller 330 and may request the transmission controller 330 to shift the transmission stage from the D/R stage to the N stage.

Furthermore, when receiving the failure state information from the braking controller 320, the remote parking control apparatus 100 may request the steering controller 340 to stop steering control and may request the remote controller 350 to control starting of the vehicle, when it is identified that the transmission stage engages with the P stage or the EPB. For example, in a remote parking control mode, the remote parking control apparatus 100 may request the remote controller 350 to turn off starting of the vehicle, when the transmission stage is the P stage, and may request the remote controller 350 to maintain starting of the vehicle, when the transmission stage is a stage except for the P stage. Furthermore, the remote controller 350 may perform remote cooperation control, when a driver enters the remote parking control mode in the outside of the vehicle, and may fail to perform remote cooperation control, when the driver enters the remote parking control mode in the interior of the vehicle.

Thus, the steering controller 340 may perform steering control depending on a request of the remote parking control apparatus 100. Furthermore, the remote controller 350 may control starting of the vehicle depending on a request of the remote parking control apparatus 100.

Figure 7:
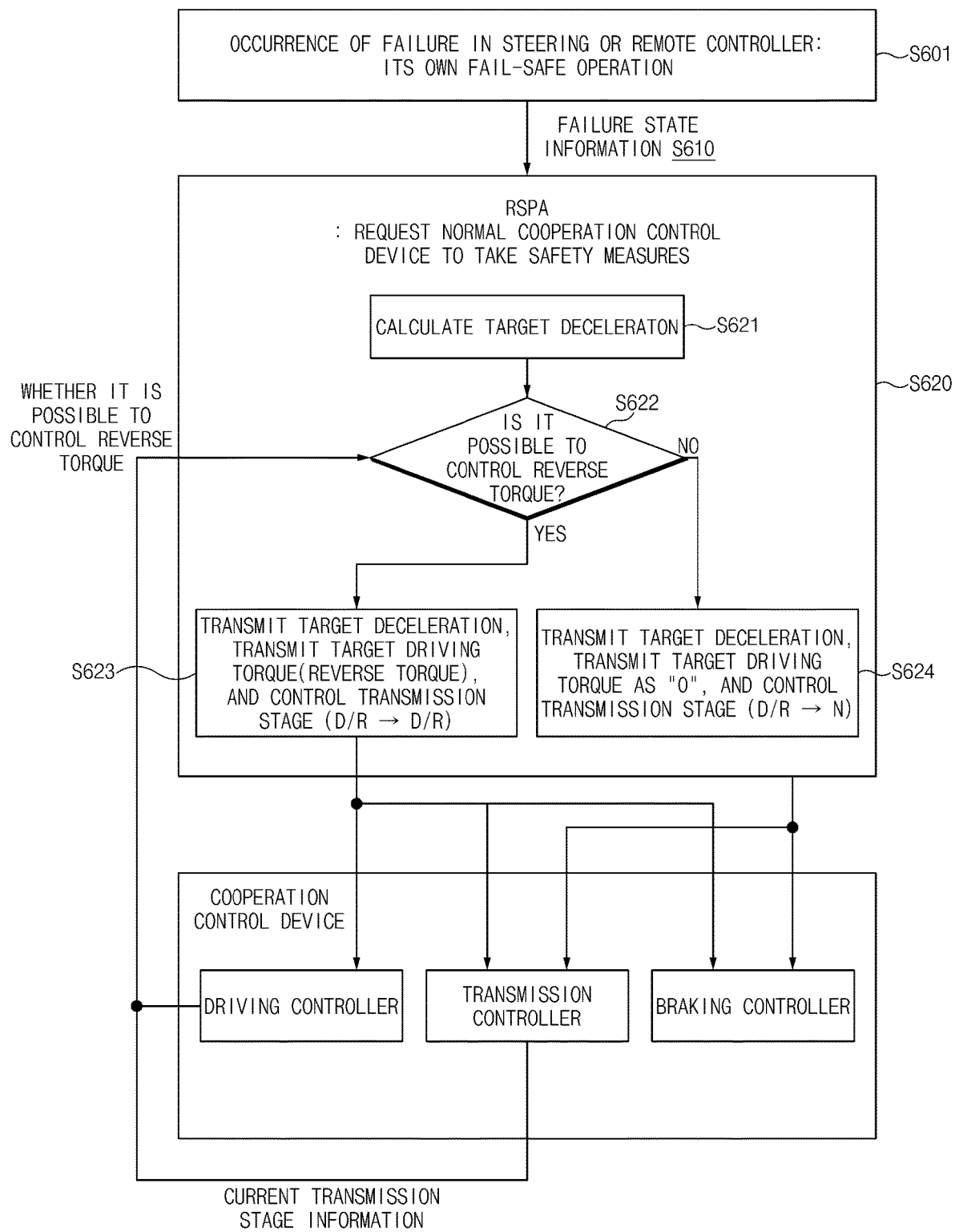
FIG. 7 is a drawing illustrating a fail-safe operation method when a steering controller or a remote controller fails according to various exemplary embodiments of the present invention.

FIG. 7 is a drawing illustrating a fail-safe operation method when a steering controller or a remote controller fails according to various exemplary embodiments of the present invention.

Referring to FIG. 7, in S601, a steering controller 340 or a remote controller 350 may perform its own fail-safe operation, when there is a failure in the steering controller 340 or the remote controller 350. In other words, for its own fail-safe operation, the steering controller 340 may stop steering control and the remote controller 350 may control starting of the vehicle, when it is identified that the transmission stage engages with a P stage or an EPB.

In S610, the steering controller 340 or the remote controller 350, which fails, may transmit failure state information to the remote parking control apparatus 100.

In S620, the remote parking control apparatus 100 may request a cooperation control device 300 being in a normal state to perform a fail-safe operation.

In other words, in S621, the remote parking control apparatus 100 may determine a target deceleration depending on whether there is a probability of colliding with a surrounding obstacle.

In S622, the remote parking control apparatus 100 may identify information indicating whether it is possible to use a reverse torque, which is received from a driving controller 310, may provide a braking request depending on whether it is possible to control the reverse torque, and may request a transmission controller 330 to control a transmission stage.

In other words, when it is possible to use the reverse torque, in S623, the remote parking control apparatus 100 may transmit a target driving torque to the driving controller 310, may transmit a target deceleration to a braking controller 320, and may request the transmission controller 330 to maintain the transmission stage as a D/R stage.

When it is impossible to use the reverse torque, in S624, the remote parking control apparatus 100 may transmit the target driving torque as "0" to the driving controller 310, may transmit the target deceleration to the braking controller 320, and may request the transmission controller 330 to shift the transmission stage from the D/R stage to an N stage.

Furthermore, the remote parking control apparatus 100 may request the steering controller 340 to stop steering control, when the remote controller 350 fails, and may request the steering controller 340 to control starting of the vehicle when it is identified that the transmission stage engages with a P stage or an EPB, when the steering controller 340 fails (upon remote control). In the instant case, the remote parking control apparatus 100 may request the remote controller 350 to turn off starting of the vehicle, when the transmission stage is the P stage, and may request the remote controller 350 to maintain starting of the vehicle, when the transmission stage is a stage except for the P stage.

The driving controller 310 may control the driving torque depending on a request of the remote parking control apparatus 100.

The braking controller 320 may perform braking control depending on a request of the remote parking control apparatus 100.

The transmission controller 330 may perform transmission control depending on a request of the remote parking control apparatus 100.

Figure 8:
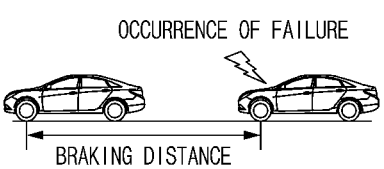
FIG. 8 is a drawing illustrating an effect upon a fail-safe operation according to various exemplary embodiments of the present invention.

FIG. 8 is a drawing illustrating an effect upon a fail-safe operation according to various exemplary embodiments of the present invention.

Referring to FIG. 8, it is difficult to shorten a braking distance, when a motor reverse torque is not used in a braking control impossible state. On the other hand, by ensuring a braking force using a motor reverse torque in the braking control impossible state, in a state where it is impossible to perform braking control, a braking distance may be shortened while driving on a flatland the vehicle may be stopped upon driving on a hill.

Accordingly, in a failure situation where a braking controller 320 does not perform a normal operation, although a remote parking control apparatus 100 and a cooperation control device 300 takes safety measures (driving: idle torque control, shift: N/P stage control for each vehicle speed), safety of the vehicle may fail to be ensured without braking control of the braking controller 320 in a limited situation such as a downhill. Thus, an exemplary embodiment of the present invention may ensure an additional braking method based on motor reverse torque control of an electrification vehicle (e.g., an HEV, an EV, or FCEV), thus ensuring safety of the remote parking control apparatus.

Figure 9:
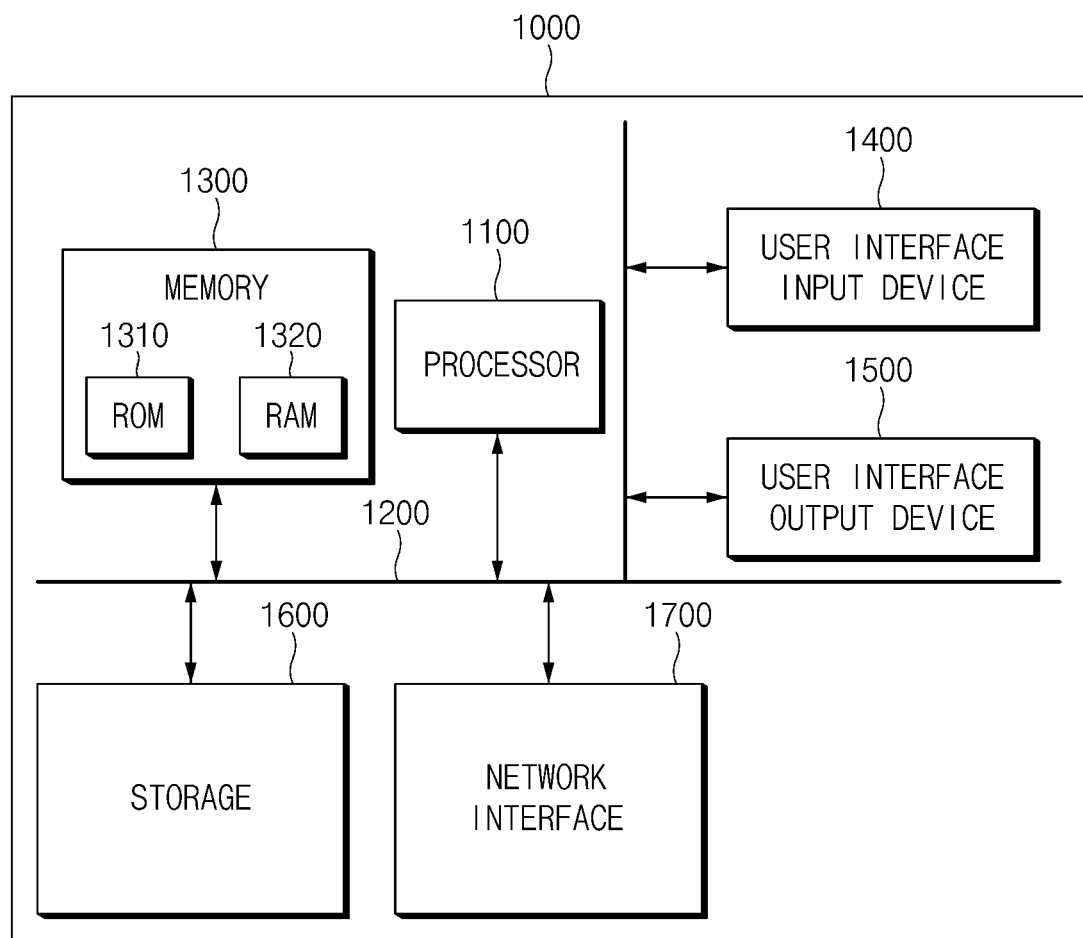
FIG. 9 is a block diagram illustrating a computing system according to various exemplary embodiments of the present invention.

FIG. 9 is a block diagram illustrating a computing system according to various exemplary embodiments of the present invention.

Referring to FIG. 9, a computing system 1000 may include at least one processor 1100, a memory 1300, a user interface input device 1400, a user interface output device 1500, non-transitory storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may ensure an additional braking method using motor reverse torque control of an electrification vehicle (e.g., an HEV, an EV, or FCEV), thus ensuring safety upon automatic remote parking control.

Furthermore, various effects ascertained directly or indirectly through the present invention may be provided.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A remote parking control system, including:
   at least one controller; and
   a remote parking control apparatus configured to perform braking control according to motor reverse torque control and transmission stage control, when a braking controller among the at least one controller fails, upon remote parking control,
   wherein the remote parking control apparatus is configured to request a driving controller and a transmission controller among the at least one controller to control a target driving torque and a transmission stage, depending on whether it is possible to use a reverse torque,
   transmit the reverse torque to the driving controller and to request the transmission controller to maintain a current transmission stage, when it is possible to use the reverse torque, and
   request the transmission controller to change the current transmission stage without transmitting the reverse torque to the driving controller, when it is impossible to use the reverse torque.

2. The remote parking control system of claim 1, wherein the remote parking control apparatus is configured to request controllers being in a normal state among the at least one controller to perform a fail-safe operation, when receiving a failure state information from the braking controller.

3. The remote parking control system of claim 1, wherein the remote parking control apparatus is configured to determine a target deceleration and to determine an amount of motor reverse torque using the determined target deceleration.

4. The remote parking control system of claim 3, wherein the remote parking control apparatus of a vehicle is configured to determine the target deceleration depending on whether there is a surrounding obstacle and whether there is a probability of colliding between the vehicle and the surrounding obstacle.

5. The remote parking control system of claim 3, wherein the remote parking control apparatus is configured to receive information indicating whether it is possible to use the reverse torque from the driving controller among the at least one controller.

6. The remote parking control system of claim 5, wherein the driving controller is configured to determine whether it is possible to use the reverse torque using a battery state and a current transmission stage.

7. The remote parking control system of claim 6, wherein the driving controller of the vehicle is configured to correct the reverse torque using vehicle specifications of the vehicle and a road environment.

8. The remote parking control system of claim 1, wherein the remote parking control apparatus is configured to request a steering controller among the at least one controller to stop steering control.

9. The remote parking control system of claim 1, wherein the remote parking control apparatus is configured to request a remote controller among the at least one controller to control starting of a vehicle, when it is identified that the current transmission stage of the vehicle engages with a P stage or an electronic parking break (EPB).

10. The remote parking control system of claim 9, wherein the remote parking control apparatus is configured to request the remote controller to turn off the starting of the vehicle, when the current transmission stage is the P stage, and configured to request the remote controller to maintain the starting of the vehicle, when the current transmission stage is a stage except for the P stage.

11. The remote parking control system of claim 1, wherein the braking controller is configured to perform hydraulic control and EPB engaging at a same time for a fail-safe operation.

12. The remote parking control system of claim 1, wherein the remote parking control apparatus is configured to transmit failure state information to the at least one controller, when it is determined that the remote parking control apparatus fails, and
wherein the at least one controller is configured to perform its own fail-safe operation, when receiving the failure state information from the remote parking control apparatus.

13. The remote parking control system of claim 12, wherein the driving controller among the at least one controller is configured to determine whether it is possible to use the reverse torque based on a battery state and the current transmission stage of a vehicle, configured to correct a motor reverse torque based on vehicle specifications and a road environment of the vehicle, when it is possible to use the reverse torque, and configured to output a driving torque as "0", when it is impossible to use the reverse torque.

14. The remote parking control system of claim 12, wherein the braking controller among the at least one controller is configured to perform hydraulic control and EPB engaging at a same time, when receiving the failure state information from the remote parking control apparatus.

15. The remote parking control system of claim 1, wherein the remote parking control apparatus is configured to transmit a target deceleration to the braking controller being in a normal state among the at least one controller and requests the braking controller to engage with an EPB, when it is identified that a vehicle is stopped, requests the transmission controller being in the normal state among the at least one controller to control a transmission stage depending on whether it is possible to use the reverse torque, requests a steering controller being in the normal state among the at least one controller to stop steering control, and requests a remote controller being in the normal state among the at least one controller to control starting of the vehicle, when the driving controller among the at least one controller fails.

16. The remote parking control system of claim 15, wherein the remote parking control apparatus is configured to request the transmission controller to maintain the current transmission stage to use the reverse torque, when it is possible to use the reverse torque, and requests the transmission controller to control an N stage to block a driving force, when it is impossible to use the reverse torque.

17. A fail-safe method in remote parking control, the fail-safe method comprising:
  determining whether one of at least one controller and a remote parking control apparatus fails, upon the remote parking control;
  performing braking control according to motor reverse torque control and transmission stage control when a braking controller among the at least one controller fails;
  requesting a driving controller and a transmission controller among the at least one controller to control a target driving torque and a transmission stage, depending on whether it is possible to use a reverse torque;
  transmitting the reverse torque to the driving controller and to request the transmission controller to maintain a current transmission stage, when it is possible to use the reverse torque; and
  requesting the transmission controller to change the current transmission stage without transmitting the reverse torque to the driving controller, when it is impossible to use the reverse torque.

* * * * *